United States Patent [19]

Lee

[11] Patent Number: 6,157,826
[45] Date of Patent: Dec. 5, 2000

[54] AUTHENTICATION KEY GENERATION METHOD AND APPARATUS

[75] Inventor: Jae Wook Lee, Incheon, Rep. of Korea

[73] Assignee: Daewoo Telecom Ltd., Incheon, Rep. of Korea

[21] Appl. No.: 09/299,649

[22] Filed: Apr. 27, 1999

[30] Foreign Application Priority Data

Apr. 28, 1998 [KR] Rep. of Korea ...................... 98-15163

[51] Int. Cl.$^7$ ...................................... H04M 1/66
[52] U.S. Cl. ......................... 455/411; 455/410; 380/248; 380/247
[58] Field of Search .................................... 455/410, 411, 455/31.1, 433, 550, 403, 435; 380/248, 247, 273

[56] References Cited

U.S. PATENT DOCUMENTS

| | | | |
|---|---|---|---|
| 5,596,641 | 1/1997 | Ohashi et al. | 380/23 |
| 5,613,214 | 3/1997 | Shirasawa et al. | 455/54.1 |
| 6,047,071 | 4/2000 | Dhah | 380/273 |
| 6,075,860 | 6/2000 | Ketcham | 380/25 |
| 6,091,945 | 7/2000 | Oka | 455/411 |

*Primary Examiner*—Lee Nguyen
*Assistant Examiner*—Congvan Tran
*Attorney, Agent, or Firm*—Bacon & Thomas, PLLC

[57] ABSTRACT

A method generates an authentication key to be used in an authentication algorithm at position at which a mobile station's subscriber is located. First, when there is a request to create the authentication key by a customer service center (CSC), at an authentication center module (ACM), a first type of parameters are issued and transmitted to a mobile station (MS). At the MS, a reference key to be used in creating the authentication key is then obtained on the basis of the first type of parameters to send the reference key to the ACM. A second type of parameter is derived by using the first type of parameters when the reference key is received from the MS and then transmitted to the MS at the ACM. At the MS, the authentication key is generated by using the first type of parameters, the second type of parameter and the reference key and a key generation complete message is transferred to the ACM. In response to the key generation complete message from the MS, at the ACM, the authentication key is generated by using the reference key from the MS, one of the first type of parameters and the second type of parameter and a key generation complete message is transferred to the CSC to allow the MS to be activated so that the MS's subscriber can use a communications service provided by a mobile communications system.

8 Claims, 2 Drawing Sheets

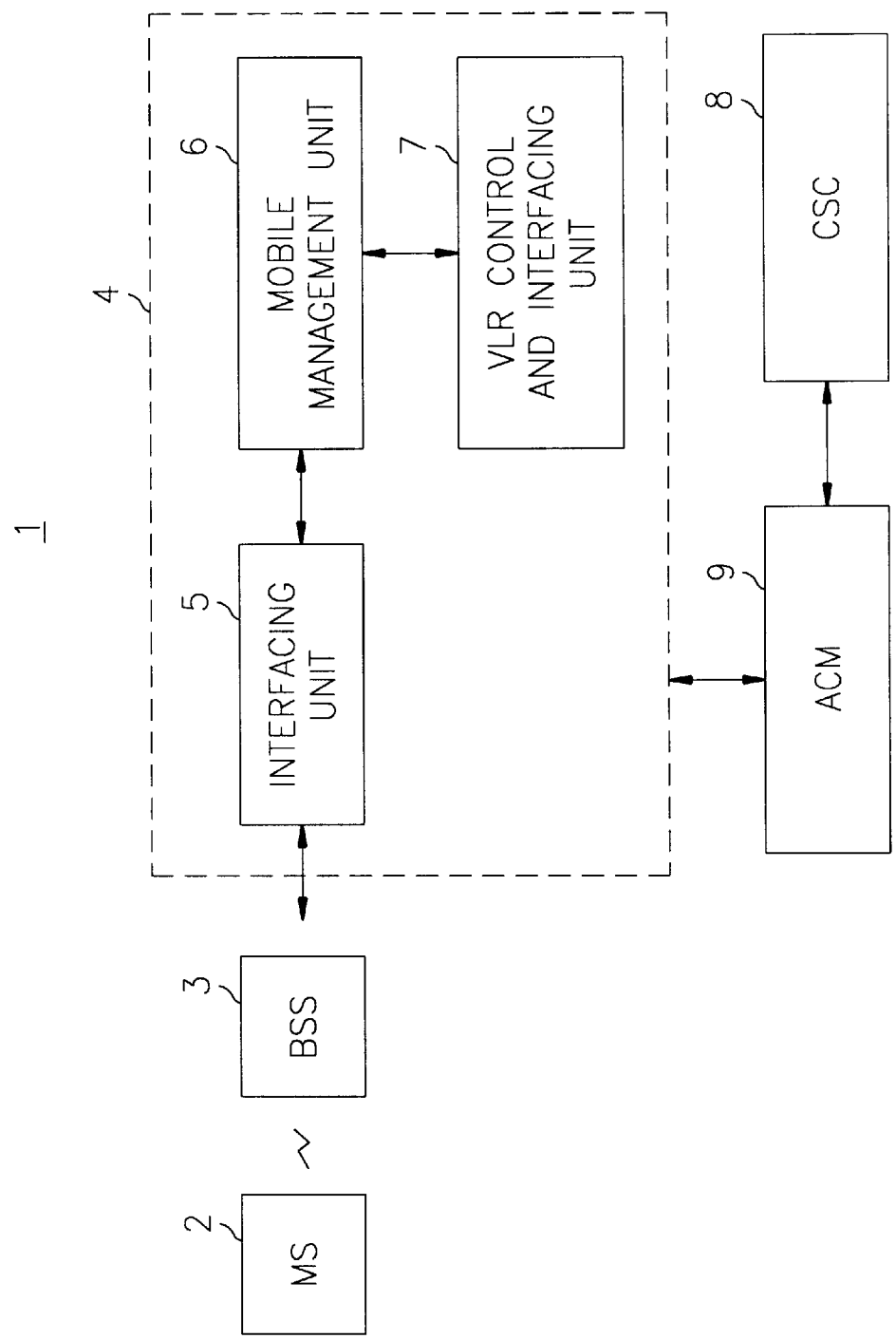

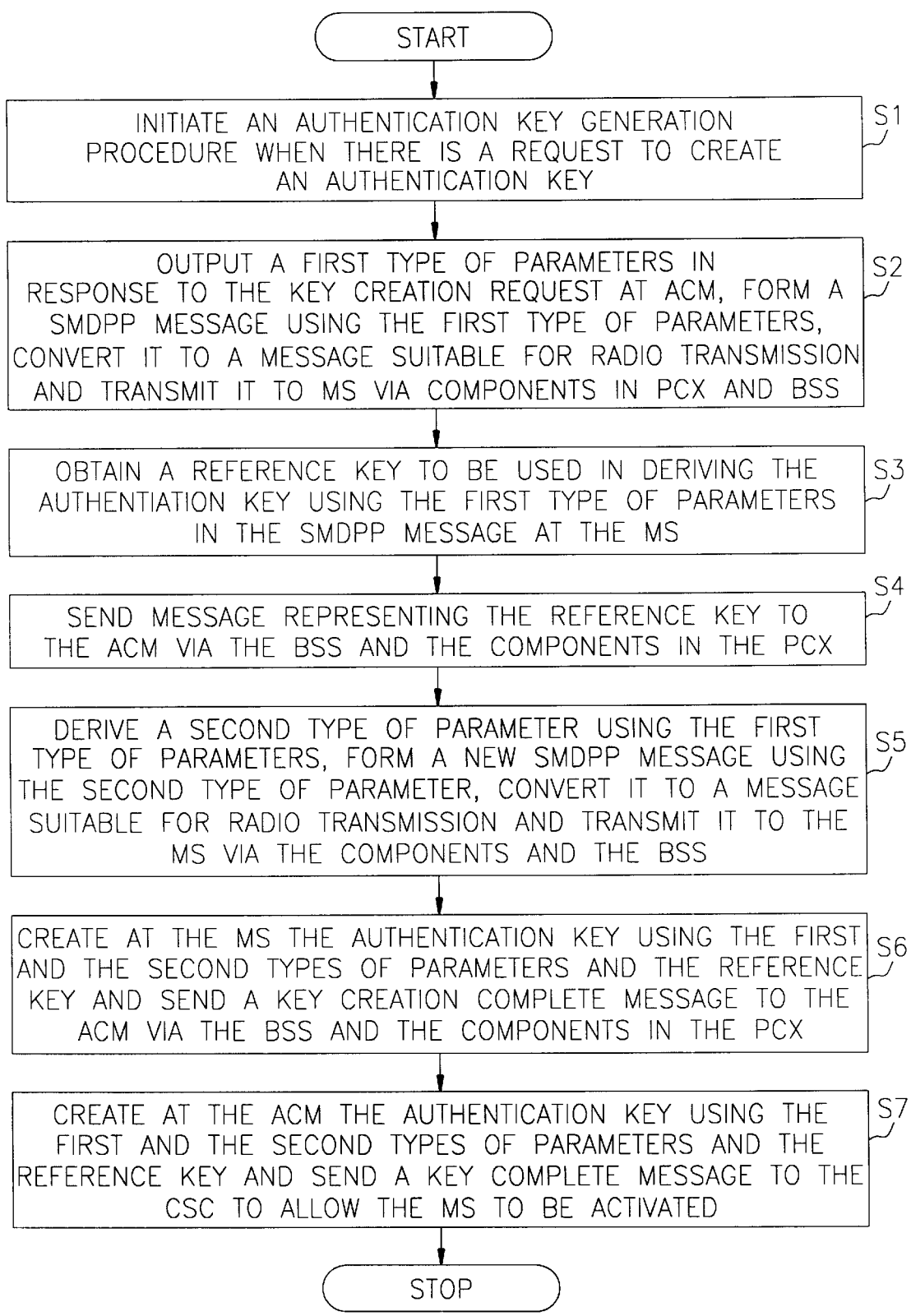

AUTHENTICATION KEY GENERATION METHOD AND APPARATUS

FIELD OF THE INVENTION

The present invention relates to a mobile communications system; and, more particularly, to a method and apparatus capable of effectively generating an authentication key to be used in an authentication algorithm of the system.

BACKGROUND OF THE INVENTION

In a mobile communications system, an authentication algorithm is developed to authenticate a user's identity so as to prevent fraudulent use of services. Communications services such as banking services, credit card services, automatic teller machine services and general information services require that a user be accurately identified for the purpose of security, proper billing and avoidance of fraud.

Using the authentication algorithm, an authentication key is created first by a communications agency which deals with services such as a terminal set up and a number change requested by mobile subscribers; and then an authentication procedure is performed with the authentication key created. Normally, the authentication key is created immediately after giving to subscribers of new mobile stations telephone numbers, whereas the authentication procedure is performed whenever the user employs a service. The authentication key is conventionally obtained by an authentication key generation scheme which employs several variable parameters for data security and reliability in the communications agency.

However, the conventional authentication key generation scheme has a shortcoming in that it does not allow the authentication key by any other to be generated except the communications agency, thereby inconveniencing the mobile station's subscribers.

SUMMARY OF THE INVENTION

It is, therefore, a primary object of the present invention to provide a method and apparatus capable of providing an improved authentication key generation procedure employing a personal communications service exchange (PCX).

In accordance with one aspect of the present invention, there is provided a method, for use in a mobile communications system, for generating an authentication key to be used in an authentication algorithm, the method comprising the steps:

(a) when there is a request to create the authentication key by a customer service center (CSC), issuing and transmitting, at an authentication center module (ACM), a first type of parameters to a mobile station (MS);

(b) obtaining, at the MS, a reference key to be used in creating the authentication key on the basis of the first type of parameters and sending the reference key to the ACM;

(c) deriving, at the ACM, a second type of parameter by using the first type of parameters when the reference key is received from the MS and transmitting the second type of parameter to the MS;

(d) generating, at the MS, the authentication key by using the reference key, one of the first type of parameters and the second type of parameter and transferring a key generation complete message to the ACM; and (e) in response to the key generation complete message from the MS, generating, at the ACM, the authentication key by using the reference key from the MS, said one of the first type of parameters and the second type of parameter and transferring a key generation complete message to the CSC to allow the MS to be activated so that the MS's subscriber uses a communications service provided by the system.

In accordance with another aspect of the present invention, there is provided an apparatus, for use in a mobile communications system, for generating an authentication key to be used in an authentication algorithm, the apparatus comprising:

means for issuing and transmitting a first type of parameters to a mobile station (MS) when there is a request to create an authentication key by a customer service center;

means for deriving a reference key to be used in creating the authentication key based on the first type of parameters and sending the reference key derived to an authentication center module (ACM);

means for deriving a second type of parameter by using the first type of parameters when the reference key is received from the MS and transmitting the second type of parameter to the MS;

means for generating the authentication key by using one of the first type of parameters, the second type of parameter and the reference key and transferring a key generation complete message to the ACM; and means for, in response to the key generation complete message from the MS, generating, generating the authentication key by using the reference key from the MS, said one of the first type of parameters and the second type of parameter and transferring a key generation complete message to the CSC to allow the MS to be activated so that the MS's subscriber uses a communications service provided by the system.

BRIEF DESCRIPTION OF THE DRAWINGS

The above and other objects and features of the present invention will become apparent from the following description of preferred embodiments given in conjunction with the accompanying drawings, in which:

FIG. 1 is a block diagram of an apparatus for generating an authentication key to be used in an authentication algorithm in accordance with the present invention; and FIG. 2 presents a flow chart for explaining the procedure for generating the authentication key in accordance with the invention.

DETAILED DESCRIPTION OF THE PREFERRED EMBODIMENTS

Referring to FIG. 1, there is provided a block diagram of an apparatus 1 for creating an authentication key to be used in an authentication algorithm in accordance with a preferred embodiment of the present invention. The present invention employs a base station system (BSS) 3 and a PCX 4 which is equipped with an interfacing unit 5, a mobile management unit 4 and a visitor location register (VLR) control and interfacing unit 7. For generation of the authentication key, the invention further employs a customer service center (CSC) 8 and an authentication center module (ACM) 9. Accordingly, it is possible to generate the authentication key at any position at which a mobile station (MS)'s subscriber is located. Normally, this authentication key generation procedure will be automatically carried out after a telephone number of the MS is given by a mobile communications system. For simplicity sake, only one MS, e.g., MS 2, and the BSS 3 radio connected thereto, among many MS's and BSS's, will be illustrated hereinafter.

The BSS 3 used in the invention contains a base transceiver station (BTS) and a base station controller (BSC) (not shown) and administers mobile stations, i.e., the MS 2, within the coverage area thereof, wherein there are used a Radio, an A and an A-bis interfaces issued at Open Systems Interconnection (OSI). Connected between the BSS 3 and the ACM 9 is the PCX 4 which processes and conveys message and/or data therebetween for radio transmission. The ACM 9 may include an over the air service provision function (OTAF) module and an authentication center (AC) (not shown). The OTAF module serves to perform a radio interface activation function and also interface between the VLR control and interfacing unit 7 and the CSC 8; and the AC carries out a series of authentication processes.

Now, a procedure of generating the authentication key in accordance with the invention will be described in detail with reference to FIG. 2 in parallel with FIG. 1.

The procedure of the present invention is initiated at step S1 when a request to create the authentication key is given by the CSC 8. At a following step S2, in response to such key creation request, the ACM 9 outputs a first type of parameters and transmits it to the MS 2 through the components in the PCX 4 and the BSS 3. The first type of parameters used herein are referred to as MODVAL and PRIMVAL, wherein the MODVAL represents a mudulo value in an operation to derive a MSKEY (mobile station partial key) which will be described later and the PRIMVAL indicates a numerator value in the operation. The first type of parameters can be found in Telecommunications Industry Association/Electronic Industries Alliance-International Standard (TIA/EIA-IS)-725, "Time Division Multiple Access-Over The Air Service Provisioning (TDMA-OTASP)", pp. 220–223. As will be further explained later, the first type of parameters will be advantageously employed as reference parameters to generate the MSKEY.

To be more specific, first of all, the ACM 9 forms a SMDPP (short message delivery point to point) message by properly inserting the first type of parameters into SMS (short message service) data and transfers same to the VLR control and interfacing unit 7. For instance, the SMDI?P message is of a hexadecimal code or ASCII code. At the VLR control and interfacing unit 7, only the parameters are extracted from the SMDPP message transferred from the ACM 9 and then converted to a message corresponding thereto, which is suitable for radio transmission, the message including a MS key creation request message. The message is then delivered to the mobile management unit 6 which deals with general mobile subscriber administration and adapts the message to the BSS 3 through the interfacing unit 5 for interfacing therebetween. The BSS 3 relays the message provided through the interfacing unit 5 to the MS 2 through the Radio interface.

At step S3, the MS 2 receives the message transmitted from the BSS 3 and extracts the first type of parameters from the message received. Using the first type of parameters extracted, a reference key, MSKEY, to be used in creating the authentication key, is obtained. After obtaining the reference key, MSKEY, at step S4, a message representing the reference key created is sent, as a response to the MS key creation request, to the VLR control and interfacing unit 7 through the components coupled therebetween. The VLR control and interfacing unit 7 converts the message back to the SMDPP message to provide it to the ACM 9.

If the SMDPP message is received by the ACM 7 from the VLR control and interfacing unit 7, at step S5, it derives a second type of parameter, BSKEY (base station partial key), by using the first type of parameters and inserts the second type of parameter into the SMS data to output and send a new SMDPP massage to the VLR control and interfacing unit 7. The second type of parameter can be also found in TIA/EIA-IS)-725, "TDMA-OTASP", pp. 220–223. In a preferred embodiment of the present invention, the second type of parameter, BSKEY, is advantageously used for data security and reliability.

The VLR control and interfacing unit 7 also extracts the second type of parameter from the new SMDPP message and converts the extracted second type of parameter to a message corresponding thereto, which is also suitable for radio transmission. The message is then transmitted from the VLR control and interfacing unit 7 to the MS 2 through the components connected therebetween. When the message is received by the MS 2, at step S6, it generates the authentication key by using the second type of parameter, BSKEY, in the message, one of the first type of parameters, MODVAL, and the reference key, MSKEY. The authentication key created at the MS 2 will be advantageously applied in the following conventional authentication procedure. After creating the authentication key at the MS 2, it sends a key creation complete message to the ACM 9 through the components coupled therebetween.

In response to the key creation complete message from the MS 2, at step S7 the authentication key is also created at the ACM 9 employing the reference key, MSKEY in the SMDPP message, one of the first type of parameters, MODVAL, and the second type of parameter, BSKEY, by the same key creation technique. The authentication key created at the ACM 9 will be also used in the following authentication procedure. When the authentication key is created at the ACM 9, it outputs and provides the CSC 8 with a key creation complete message to allow the MS 2 to be activated so that the MS 2's subscriber can get a communications service provided by the mobile communications system. As a result, since the inventive key generation scheme can enable the MS 2 to create the authentication key at any location at which its subscriber locates, more convenience key creation can be accomplished.

While the present invention has been shown and described with respect to the particular embodiments, it will be apparent to those skilled in the art that many changes and modifications may be made without departing from the spirit and scope of the invention as defined in the appended claims.

What is claimed is:

1. A method, for use in a mobile communications system, for generating an authentication key to be used in an authentication algorithm, the method comprising the steps:

(a) when there is a request to create the authentication key by a customer service center (CSC), issuing and transmitting, at an authentication center module (ACM), a first type of parameters to a mobile station (MS);

(b) obtaining, at the MS, a reference key to be used in creating the authentication key on the basis of the first type of parameters and sending the reference key to the ACM;

(c) deriving, at the ACM, a second type of parameter by using the first type of parameters when the reference key is received from the MS and transmitting the second type of parameter to the MS;

(d) generating, at the MS, the authentication key by using the reference key, one of the first type of parameters and the second type of parameter and transferring a key generation complete message to the ACM; and (e) in response to the key generation complete message from the MS, generating, at the ACM, the authentication key by using the reference key from the MS, said one of the first type of parameters and the second type of parameter and transferring a key generation complete message to the CSC to allow the MS to be activated so that the MS's subscriber uses a communications service provided by the system.

2. The method of claim 1, wherein the first type of parameters refer to as MODVAL and PRIMVAL, the MODVAL representing a mudulo value in an operation to derive the reference key and the PRIMVAL indicating a numerator value in the operation; and the second type of parameter represents BSKEY (base station partial key).

3. The method of claim 2, wherein the step (a) includes the steps:

interfacing between the MS and the ACM; and processing the first type of parameters between the interfacing means and the ACM for radio transmission, wherein the first type of parameters are inserted into a preset SMS (short message service) data to output a message of a short message delivery point to point form.

4. The method of claim 2, wherein the step (c) includes the steps:

interfacing between the MS and the ACM; and processing the second type of parameter between the interfacing means and the ACM for radio transmission, wherein the second type of parameter is inserted into a preset SMS data to output a message of a short message delivery point to point form.

5. An apparatus, for use in a mobile communications system, for generating an authentication key to be used in an authentication algorithm, the apparatus comprising:

means for issuing and transmitting a first type of parameters to a mobile station (MS) when there is a request to create an authentication key by a customer service center;

means for deriving a reference key to be used in creating the authentication key based on the first type of parameters and sending the reference key derived to an authentication center module (ACM);

means for deriving a second type of parameter by using the first type of parameters when the reference key is received from the MS and transmitting the second type of parameter to the MS;

means for generating the authentication key by using one of the first type of parameters, the second type of parameter and the reference key and transferring a key generation complete message to the ACM; and means for, in response to the key generation complete message from the MS, generating the authentication key by using the reference key from the MS, said one of the first type of parameters and the second type of parameter and transferring a key generation complete message to the CSC to allow the MS to be activated so that the MS's subscriber uses a communications service provided by the system.

6. The apparatus of claim 5, wherein the MS is interfaced to the ACM through a base station system and a personal communications service exchange (PCX).

7. The apparatus of claim 6, wherein the first type of parameters refer to as MODVAL and PRIMVAL, the MODVAL representing a mudulo value in an operation to derive the reference key and the PRIMVAL indicating a numerator value in the operation; and the second type of parameter represents BSKEY (base station partial key).

8. The apparatus of claim 7, wherein the PCX includes:

means for interfacing between the MS and the ACM; and means for processing the first and the second types of parameters between the interfacing means and the ACM for radio transmission, wherein the two types of parameters are inserted into a preset SMS (short message service) data to output a message of a short message delivery point to point form.

* * * * *